Oct. 13, 1931.  C. F. PROOS  1,827,609
METHOD OF JOINING THE ENDS OF HIGH TENSION ELECTRIC CABLES
AND AN IMPROVED JUNCTION BOX THEREFOR
Filed Jan. 16, 1928
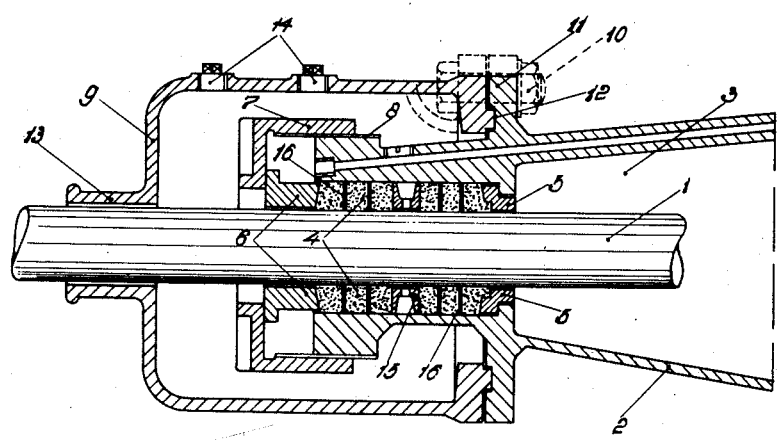
C. F. Proos
INVENTOR
Marks & Clark
ATTYS.

Patented Oct. 13, 1931

1,827,609

UNITED STATES PATENT OFFICE

CORNELIS FREDERIK PROOS, OF DELFT, NETHERLANDS, ASSIGNOR TO NAAMLOOZE VENOOTSCHAP NEDERLANDSCHE KABELFABRIEK, OF DELFT, NETHERLANDS, A DUTCH COMPANY

METHOD OF JOINING THE ENDS OF HIGH-TENSION ELECTRIC CABLES AND AN IMPROVED JUNCTION BOX THEREFOR

Application filed January 16, 1928, Serial No. 247,245, and in the Netherlands March 29, 1927.

For joining the ends of high-tension electric cables it has been the usual practice heretofore to use lead sleeves enclosed in an iron shell, the lead sleeve usually being soldered to the lead sheath of the cable.

Soldering the sleeve on to the sheath of the cable is, however, attended with difficulties, owing to the high temperature required, and especially when it is a question of heating and soldering the sheaths of cables of large dimensions, in which case considerable masses have to be heated.

A method of joining the ends of high-tension electric cables is known, according to which the ends of the cable are inserted into a junction box, and a tight point is made between the lead sheathing of the cable and the wall of the junction box by means of a stuffing box with metallic packing material. According to the present invention the filling material for the stuffing box consists of small leaves or strips of lead wool, lead waste or like particles of soft metal or a soft metallic alloy, in which metal rings are disposed at predetermined intervals. Such packing has the advantage of yielding and therefore of being easily compressible, without, however, damaging the lead sheathing of the cable.

The invention also relates to a junction box adapted for carrying out said method, wherein the stuffing boxes are enclosed, with a predetermined amount of free space, by a casing which may be provided with closable openings. The space between this casing and the stuffing box may be filled with cast insulating material, thus effectually making a tight joint between the sheath of the cable and the wall on the junction box.

One form of the invention is illustrated by the accompanying drawing, which represents, in longitudinal section, a portion of a stuffing box. 1 is the end of a cable between which and the wall of the junction box a tight joint is to be made; 2 is the wall of the junction box, the interior 3 of which is filled with liquid oil (not shown). The end of the junction box is arranged as a stuffing box in which is arranged packing material 4, which consists preferably of small leaves of lead wool, lead waste or like particles of soft metal or of a soft metallic alloy, an inner end plate or lining 5, and a gland 6. The gland 6 is pressed home by means of a cap 7, formed with an internal thread engaging a corresponding thread 8 on the end of the junction box. In order to obtain a close interconnection of the whole packing, metal rings 16 are interposed at predetermined intervals, which enable the packing material to be compressed firmly, and at the same time close any passages which may still remain between the metal leaves.

In this manner the oil filling is prevented from leaking out through the stuffing box.

With the arrangement shown in the drawing, that portion of the stuffing box which is located on the outer side of the ring 15 (towards the left of the drawing) may, if desired, be filled with ordinary packing material.

In the example shown in the drawing, the stuffing box is enclosed in a second casing or cap 9, connected by bolts e. g. as at 10 with flanges 11 formed, for this purpose, on the junction box, a packing ring 12 being interposed. The casing 9 is formed with an integral bushing 13 which fits round the cable sheathing 1. The upper part of the casing 9 is formed with a number of openings, closed by screws 14, which are adapted for filling the space between the stuffing box and casing with insulating material, whereby a perfectly tight joint is established between the lead sheathing and the junction box, whilst the insulating material protects the stuffing box from the influence of external moisture.

What I claim is:

1. In combination with a junction box having a main casing, a stuffing box, an outer casing through which the cable passes, fixed to said main casing and enclosing said stuffing box, of a plurality of soft metallic packing rings arranged in said stuffing box around said cable and a plurality of hard metallic rings spacedly interposed between said soft metallic packing rings.

2. A junction box for electric cables having a main casing adapted to be filled with an insulating liquid, said casing having a stuffing box therein, a plurality of packing rings arranged in said stuffing box around said cable, means for compressing said packing ring and an outer casing fixed to said main casing adapted to be filled with insulating liquid and enclosing said stuffing-box and having an integral bushing through which the electric cable is adapted to pass.

In testimony whereof I affix my signature.

CORNELIS FREDERIK PROOS.